(12) United States Patent
Shimamura et al.

(10) Patent No.: US 7,504,178 B2
(45) Date of Patent: *Mar. 17, 2009

(54) BATTERY MODULE AND COMBINATION BATTERY

(75) Inventors: Osamu Shimamura, Yokohama (JP); Hideaki Horie, Yokosuka (JP); Masaaki Suzuki, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 652 days.

This patent is subject to a terminal disclaimer.

(21) Appl. No.: 10/961,232

(22) Filed: Oct. 12, 2004

(65) Prior Publication Data

US 2006/0040173 A1 Feb. 23, 2006

(30) Foreign Application Priority Data

Oct. 14, 2003 (JP) ............................ P2003-353528
Aug. 24, 2004 (JP) ............................ P2004-243810

(51) Int. Cl.
*H01M 2/24* (2006.01)
(52) U.S. Cl. ........................................ 429/159; 429/61
(58) Field of Classification Search ................ 429/61, 429/149, 156, 158, 159, 160
See application file for complete search history.

(56) References Cited

U.S. PATENT DOCUMENTS 6,141,223 A * 10/2000 Fukushima ................. 361/781
6,423,441 B1 * 7/2002 Ronning et al. ......... 429/149 X
7,198,866 B2 * 4/2007 Miyamoto et al. .......... 429/149
2003/0036311 A1 2/2003 Benson et al.

FOREIGN PATENT DOCUMENTS

JP 2001-345081 12/2001
WO WO 00/41253 7/2000

OTHER PUBLICATIONS

Computer-generated English translation of JP 2001-345081 (doc date Dec. 2001).*
European Search Report, issued in Corresponding European Patent Application No. 04024222.4-1227, dated on Aug. 1, 2007.

* cited by examiner

*Primary Examiner*—Stephen J. Kalafut
(74) *Attorney, Agent, or Firm*—McDermott Will & Emery LLP (57) ABSTRACT

To provide a battery module and a combination battery, whereby the handling of unit cells is facilitated to thereby enhance the production efficiency while contributing to a downsized power source, the battery module (60) includes laminate-sheathed cells (11) as unit cells, and a retention member (50) for retaining the laminate-sheathed cells, and the retention member is configured with a printed-wiring board (51) printed with voltage measurement wirings (52) for measuring voltages of the laminate-sheathed cells, respectively.

11 Claims, 12 Drawing Sheets

BATTERY MODULE AND COMBINATION BATTERY

BACKGROUND OF THE INVENTION

The present invention relates to a battery module and a combination battery.

Recently, attention has been directed to a cell sheathed in a laminate film from a standpoint of reduced weight and the like, i.e., directed to a laminate-sheathed cell, as a secondary battery for a power source in an electric vehicle (EV) using electricity as its power source, a hybrid electric vehicle (HEV) combiningly using an engine and a motor as its power source, or the like.

The laminate-sheathed cell typically comprises a laminate film having flexibility, and an electric-power generating element encapsulated within the laminate film by heat-welding an outer periphery of the laminate film. The electric-power generating element is connected with one end of an electrode lead having its other end protruded outwardly of the laminate film (see JP-A-2001-345081).

In applying a secondary battery to a power source of an EV, HEV and the like, it is required to electrically connect a plurality of unit cells to each other and assemble them into the secondary battery, for a higher voltage and an increased capacity.

SUMMARY OF THE INVENTION

However, it is difficult to obtain an excellent handling in case of adopting the laminate-sheathed cells as a secondary battery, since a sufficient rigidity is not obtained between neighboring laminate-sheathed cells, or between laminate-sheathed cells mutually adhered in a stacked manner. It is therefore demanded to facilitate the handling upon assembling a plurality of unit cells, from a standpoint to increase a production efficiency.

Further, while it is required to draw around voltage-measurement cables in order to measure voltages of the individual laminate-sheathed cells, the operation for drawing around the cables is troublesome and additional spaces are required to accommodate the cables therein, to thereby resultingly obstruct downsizing of a power source.

The present invention has been carried out to satisfy the above described demand, and it is therefore an object of the present invention to provide a battery module and a combination battery, by which the handling of unit cells is facilitated to thereby enhance the production efficiency while contributing to a downsized power source.

To attain the above object, according to an aspect of the present invention, there is provided a battery module comprising a cell assembly configured with a plurality of unit cells electrically connected together, each unit cell including an electric-power generating element and a laminate film encapsulating the electric-power generating element therein, a battery accommodation case configured to accommodate the cell assembly therein, and a retention member configured to retain the plurality of unit cells as the cell assembly, the retention member being configured with a printed-wiring board printed with voltage measurement wirings configured to measure voltages of the plurality of unit cells, respectively.

The embodiments of the present invention will be described hereinafter with reference to the accompanying drawings.

DETAILED DESCRIPTION OF THE PREFERRED EMBODIMENTS

In this specification, the terms "unit cell", "battery module" and "combination battery" shall be defined as follows. The term "unit cell" designates one cell having its electric-power generating element exemplarily encapsulated within a laminate film, i.e., designates an individual laminate-sheathed cell. The term "battery module" designates a combination of a battery accommodation case and a cell assembly accommodated therein, such that the cell assembly is configured with: a unit cell; or a plurality of unit cells electrically connected to one another. The term "combination battery" designates a combination of a plurality of battery modules. It is possible to use any one of a "unit cell", "battery module", and "combination battery", as a battery. The appellations of "unit cell", "battery module" and "combination battery" are used to facilitate understanding of differences in sizes of batteries. Further, it is possible to use a plurality of battery modules in a combination battery, such that the plurality of battery modules are electrically connected to one another, or are independently used without electrically connecting them to each other.

First Embodiment

Figure 1:
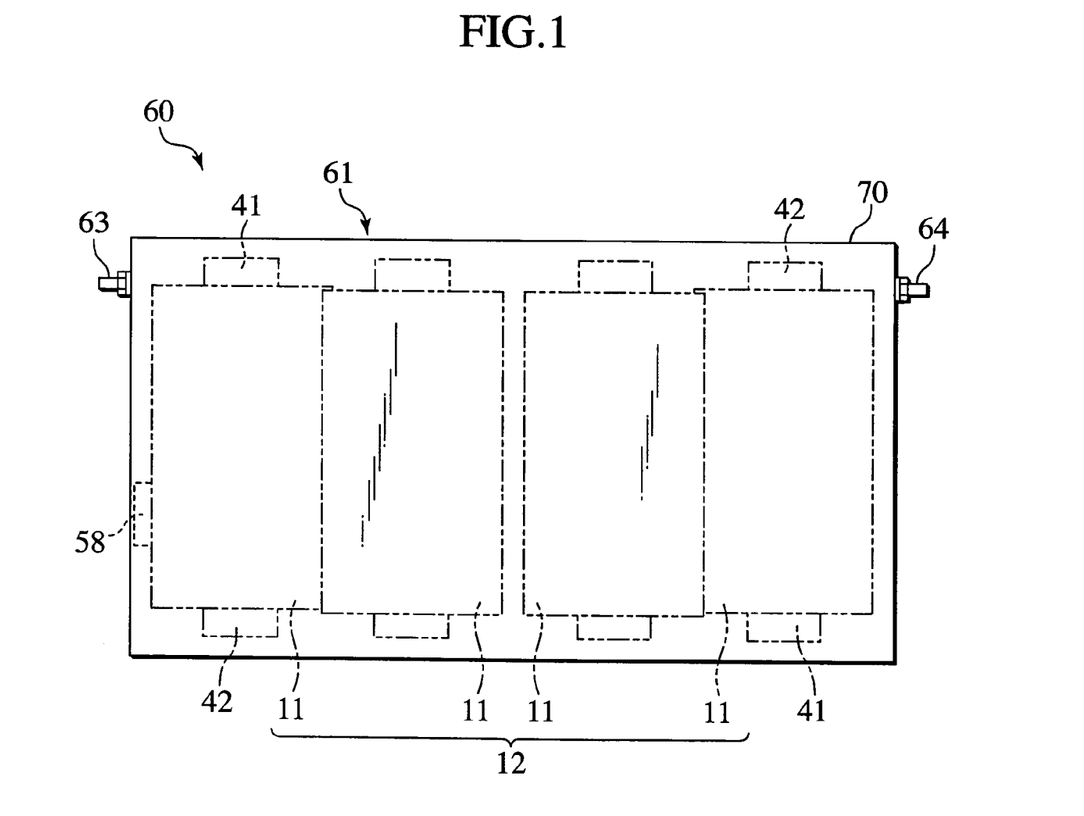
FIG. 1 is a front view of a battery module according to a first embodiment of the present invention.
Figure 4:
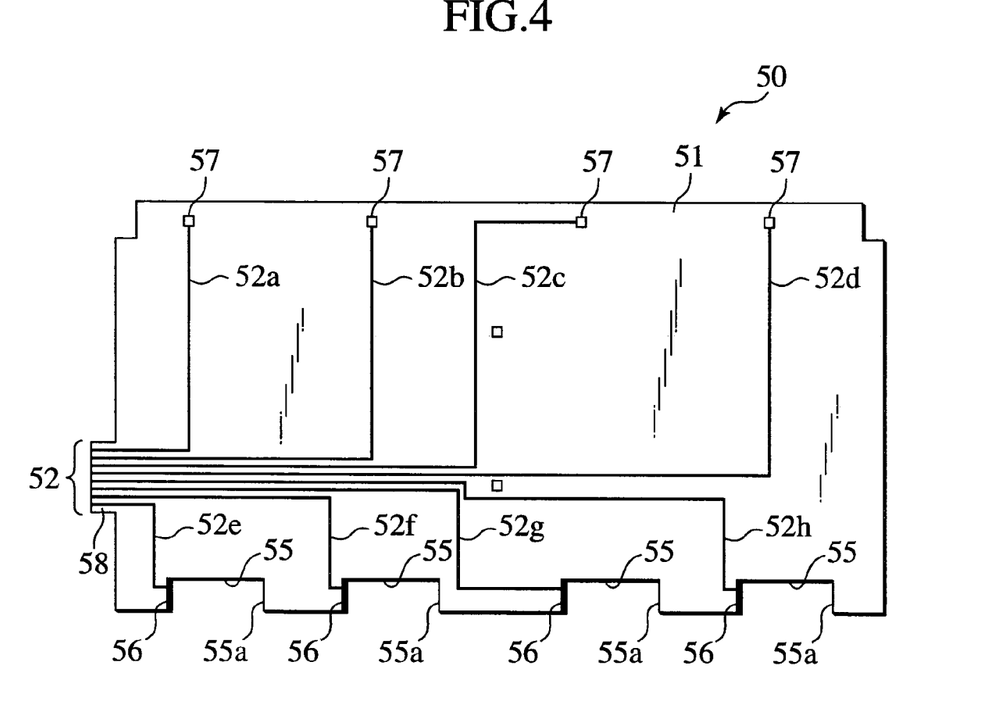
FIG. 4 is a front view of a printed-wiring board constituting the retention member.
Figure 5:
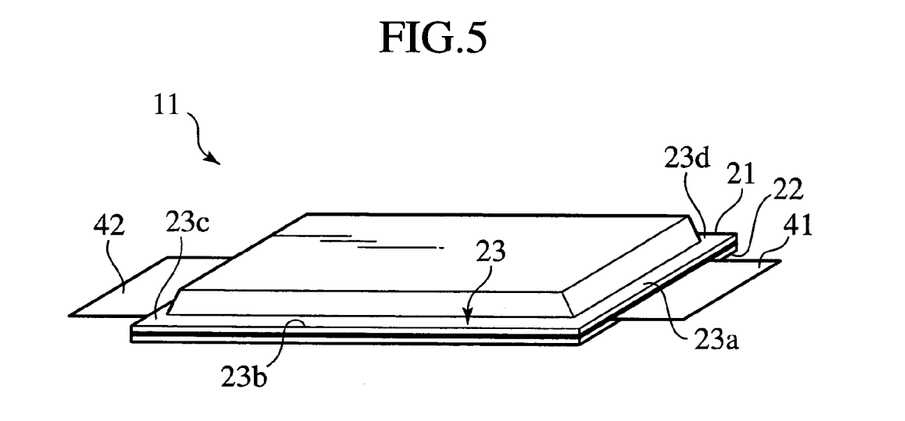
FIG. 5 is a perspective view of an example of a laminate-sheathed cell.
Figure 6A:
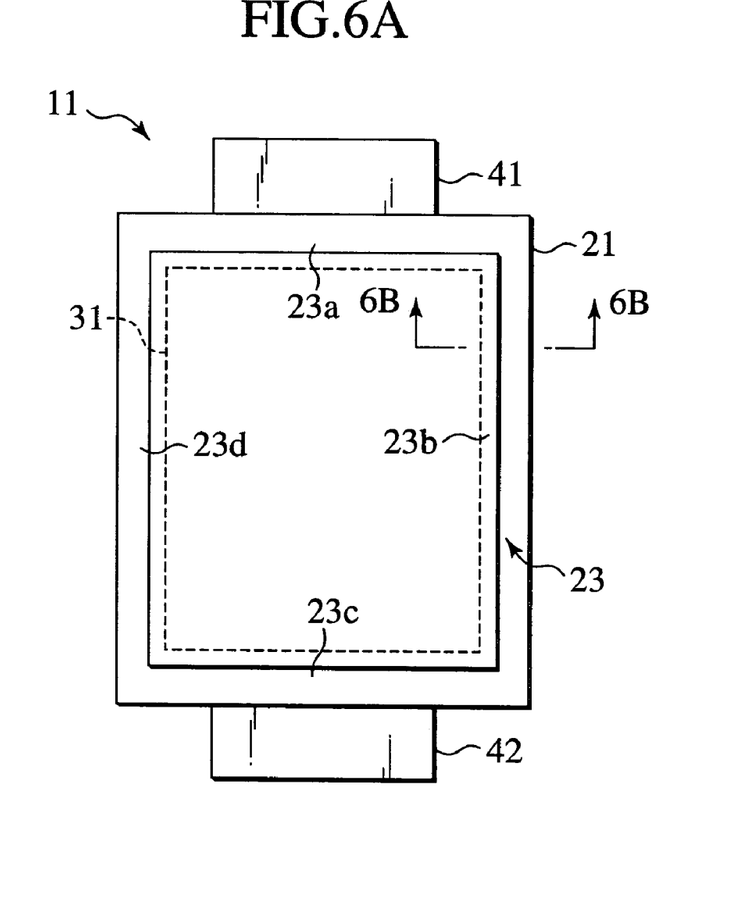
FIG. 6A is a plan view of the laminate-sheathed cell.
Figure 6B:
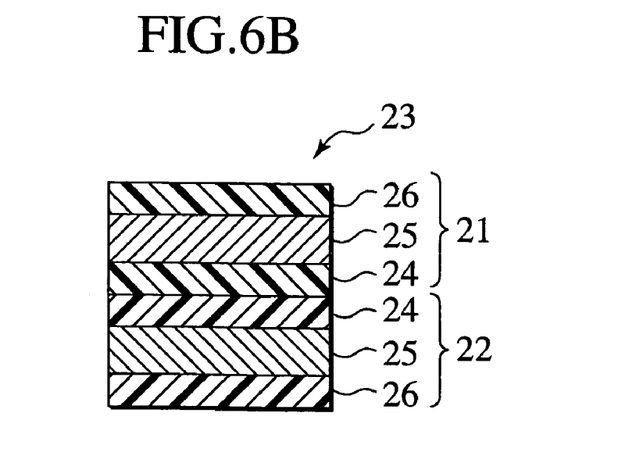
FIG. 6B is a cross-sectional view taken along a line 6B-6B of FIG. 6A.
Figures 7A, 7B, 7C:
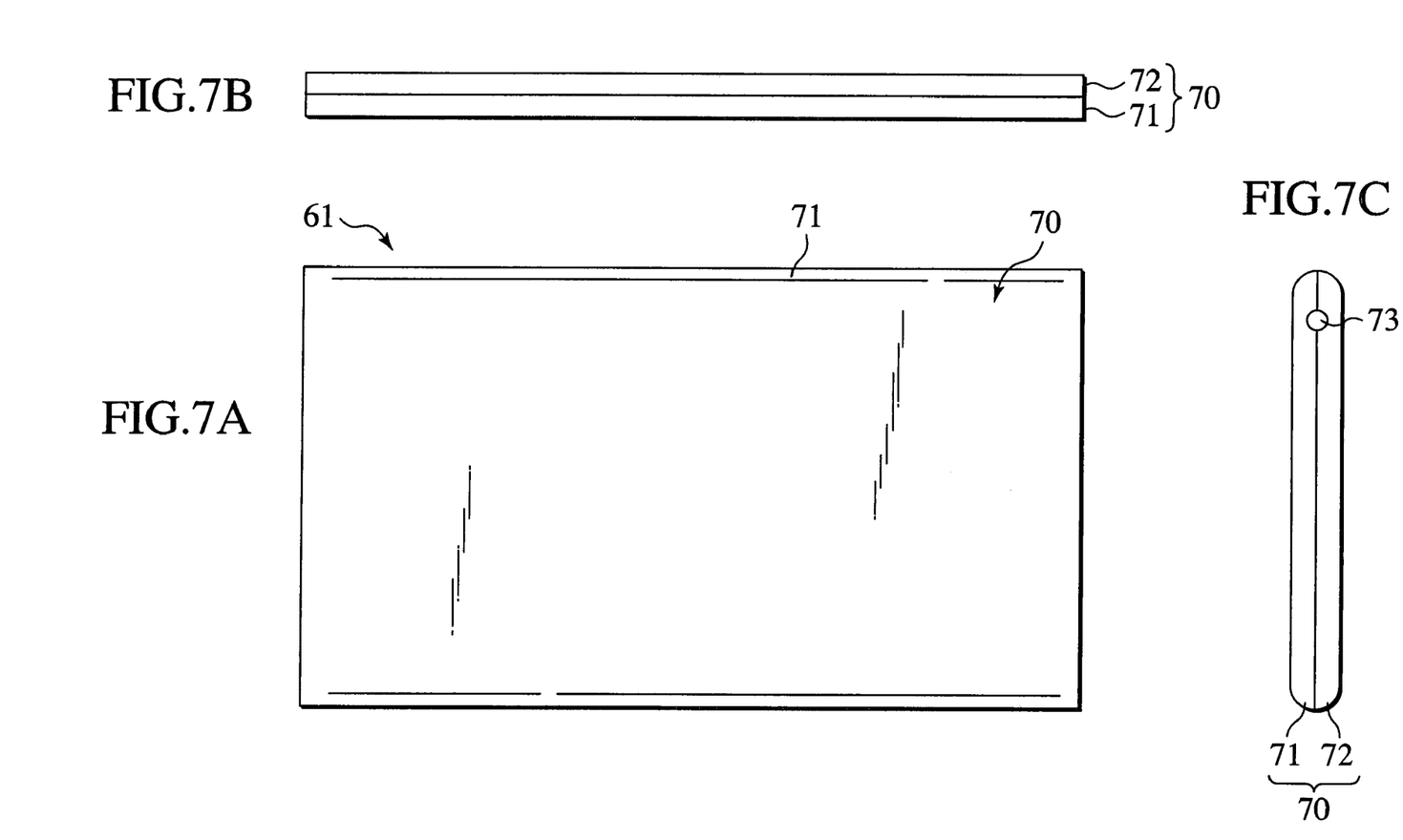
FIG. 7A through FIG. 7C are a front view, a top view, and a side view, respectively, of a battery accommodation case shown in FIG. 1.

FIG. 1 is a front view of a battery module 60 according to a first embodiment of the present invention. FIGS. 2A and 2B and FIGS. 3A and 3B are a front view, side view, top view, and bottom view, respectively, of a retention member 50 in a state that the retention member 50 retains laminate-sheathed cells 11 therein, and FIG. 4 is a front view of a printed-wiring board 51 constituting the retention member 50. FIG. 5 is a perspective view of an example of the laminate-sheathed cell 11, FIG. 6A is a plan view of the laminate-sheathed cell 11, and FIG. 6B is a cross-sectional view taken along a line 6B-6B of FIG. 6A. FIG. 7A through FIG. 7C are a front view, a top view, and a side view, respectively, of a battery accommodation case 61 shown in FIG. 1.

Generally referring to FIG. 1 through FIG. 4, the battery module 60 includes: unit cells 11; the retention member 50 for retaining the unit cells 11 therein; and the battery accommodation case 61 for accommodating therein the retention member 50 for retaining the unit cells 11 therein. The retention member 50 is configured with the printed-wiring board 51 printed with voltage measurement wirings 52 for measuring voltages of the unit cells 11, respectively. The battery module further includes clipping members 53 detachably attached to the printed-wiring board 51, so as to electrically connect electrode terminals 41, 42 of the unit cells 11 to the voltage measurement wirings 52, respectively. Used as the unit cells 11 are laminate-sheathed cells each including an electric-power generating element encapsulated within a laminate film. The battery accommodation case 61 is simply called "case 61" hereinafter, when appropriate.

In detail, the retention member 50 for retaining the laminate-sheathed cells 11 is configured with the printed-wiring board 51, in the battery module 60 of this embodiment. While the detailed explanation of the printed-wiring board 51 is omitted since the same belongs to a known technique, the printed-wiring board has a structure including wirings made of copper foils adhered onto obverse and reverse surfaces of an insulative board made of a non-electroconductive material such as bakelite or epoxy resin and having a thickness of several millimeters. The printed-wiring board 51 includes the insulative board, and is thus a relatively rigid plate material. As described later, the printed-wiring board 51 has retaining surfaces each having an elastic sheet 54 (corresponding to an elastic body) adhered thereto, and each elastic sheet 54 is electrically insulative and is compressed and elastically deformed by the associated laminate-sheathed cells 11 when the printed-wiring board 51 is accommodated within the battery accommodation case 61 (see a partially enlarged view in FIG. 2B).

The printed-wiring board 51 retains a cell assembly 12 configured with a plurality of laminate-sheathed cells 11 electrically connected together. The plurality of laminate-sheathed cells 11 are retained on both obverse and reverse surfaces 51a and 51b of the printed-wiring board 51. Concretely, the obverse surface 51a of the printed-wiring board 51 retains thereon four laminate-sheathed cells 11 aligned in a widthwise direction (right-and-left direction in FIG. 1), and the reverse surface 51b of the printed-wiring board 51 also retains thereon four laminate-sheathed cells 11 aligned in the widthwise direction. In the illustrated embodiment, totally eight laminate-sheathed cells 11 are connected together in series to constitute the cell assembly 12. In this way, it becomes possible to provide the battery module 60 capable of coping with a desired voltage, by connecting an appropriate number of laminate-sheathed cells 11 together in series.

Formed at a lower end portion of the printed-wiring board 51 are recesses 55 for receiving therein the electrode terminals 41, 42 of the laminate-sheathed cells 11, respectively.

The laminate-sheathed cell 11 retained at the left end of the obverse surface 51a of the printed-wiring board 51, has its negative electrode terminal 42 placed in the associated recess 55 and connected to a positive electrode terminal 41 of the laminate-sheathed cell 11 retained at the left end of the reverse surface 51b. In turn, the laminate-sheathed cell 11 retained at the left end of the reverse surface 51b has its negative electrode terminal 42 placed at an upper portion of the reverse surface 51b and connected to a positive electrode terminal 41 of a rightward neighbored laminate-sheathed cell 11. By repeating such a connection, the eight laminate-sheathed cells 11 are connected together in series. Further, the laminate-sheathed cell 11 at the left end of the obverse surface 51a has its positive electrode terminal 41 electrically connected with a positive terminal 63, while the laminate-sheathed cell 11 at the right end of the obverse surface 51a has its negative electrode terminal 42 electrically connected with a negative terminal 64.

There are adopted appropriate connecting members such as bus-bars 80, in case of mutually connecting the electrode terminals 41, 42 of neighboring laminate-sheathed cells 11 at upper portions of the obverse surface 51a and reverse surface 51b of the printed-wiring board 51, respectively. As described later, two electrode terminals 41, 42 placed in the pertinent recess 55 are directly and electrically connected to each other, by the associated clipping member 53.

The printed-wiring board 51 is printed with a plurality (eight in the illustrated embodiment) of voltage measurement wirings 52 for measuring voltages of the plurality (eight in the illustrated embodiment) of laminate-sheathed cells 11, respectively (see FIG. 4). Particularly, in this embodiment, the plurality of voltage measurement wirings 52 are printed on the obverse and reverse surfaces 51a and 51b, respectively, since the plurality of laminate-sheathed cells 11 are retained on the obverse and reverse surfaces 51a and 51b of the printed-wiring board 51, respectively. Concretely, eight voltage measurement wirings 52 (generic designation of 52a through 52h) are printed on the obverse surface 51a of the printed-wiring board 51, since four laminate-sheathed cells 11 are retained thereon. Similarly, the reverse surface 51b is printed with eight voltage measurement wirings 52.

Although the wiring pattern of the voltage measurement wirings 52 is not particularly limited, measurement terminals 56 provided at one ends of the voltage measurement wirings 52e through 52h are arranged at inner edges 55a of the recesses 55, respectively, in this embodiment. Further, measurement terminals 57 provided at one ends of the voltage measurement wirings 52a through 52d are arranged at an upper portion of the printed-wiring board 51 where the electrode terminals 41, 42 of the laminate-sheathed cells 11 are arranged. Herein, the electrode terminals 41, 42 of the retained laminate-sheathed cells 11 are overlapped with the measurement terminals 57, respectively. These electrode terminals 41, 42 of the laminate-sheathed cells 11 are electrically connected to the measurement terminals 57, respectively, by exemplarily soldering or ultrasonic welding these overlapped portions to each other. The other ends of the voltage measurement wirings 52 are connected to a terminal section 58 provided at a left end of the printed-wiring board 51. Although not shown, this terminal section 58 is detachably connected with a connector connected to an external controlling apparatus so that the external controlling apparatus is allowed to measure the voltages of the laminate-sheathed cells 11.

The clipping members 53 are detachably attached to the recesses 55 of the printed-wiring board 51, respectively. Each clipping member 53 has right and left sides formed with grooves 53a to be fitted onto inner edges 55a of the associated recess 55, respectively. Each clipping member 53 is attached to the associated recess 55, by inserting the former into the latter while fitting the grooves 53a onto the inner edges 55a of the recess 55, respectively. As described above, placed in each recess 55 are electrode terminals 41, 42 of the associated obverse and reverse laminate-sheathed cells 11, and the associated clipping member 53 is formed with an accommodating space for accommodating therein the two electrode terminals 41, 42 positioned in the recess 55. Within this accommodating space, the two electrode terminals 41, 42 are integrally clipped and electrically connected to each other. Each clipping member 53 is provided with an interior wiring 59 for electrically connecting: the two electrode terminals 41, 42 clipped in the clipping member; to the associated measurement terminal 56 arranged at the inner edge 55a of the associated recess 55. The interior wiring 59 is exemplarily configured with a thin metal plate attached to the inner surface which defines the accommodating space. Thus, inserting the clipping member 53 into the associated recess 55 electrically connects the two electrode terminals 41, 42 positioned within the recess 55 to each other, and electrically connects the electrode terminals 41, 42 to the associated voltage measurement wiring 52. Each clipping member 53 is to exhibit such an electrical connecting function, and another function to fixedly position the two electrode terminals 41, 42 in the recess 55, i.e., a positioning function for restricting the positions of the associated two laminate-sheathed cells 11 relative to the printed-wiring board 51. This enables to omit dedicated members and dedicated operations for duly positioning the laminate-sheathed cells 11.

Preferably, each clipping member 53 comprises an element having a spring nature capable of applying a clipping pressure to the electrode terminals 41, 42, thereby ensuring the connection therebetween. Meanwhile, it is also effective to provide a stopper such as a locking pawl for preventing the clipping member 53 from falling out of the recess 55.

The printed-wiring board 51 retaining the plurality of laminate-sheathed cells 11 in the above manner is accommodated within the case 61.

The case 61 includes upper and lower spaces filled with an insulative potting material such as a lower-temperature curing type of urethane-based potting material. Filling the potting material to thereby insulatingly encapsulate and fix the connecting circuit, restricts looseness of the laminate-sheathed cells 11, and prevents disconnection of the electrical connecting circuit adopting the bus-bars, for example.

Referring to FIG. 5. FIG. 6A and FIG. 6B, each laminate-sheathed cell 11 includes: a pair of laminate films 21, 22 having flexibility; an electric-power generating element 31 encapsulated within the laminate films 21, 22 by heat-welding outer peripheries of the laminate films 21, 22 to each other; and positive and negative electrode terminals 41,42 having one ends electrically connected to the electric-power generating element 31. The electrode terminals 41, 42 are connected to the opposite end surfaces of the electric-power generating element 31, respectively. The other ends of the electrode terminals 41, 42 are outwardly protruded from the outer peripheries of the laminate films 21, 22, respectively.

The illustrated laminate-sheathed cell 11 is a lithium-ion secondary cell, for example, in which the stacked type of electric-power generating element 31 is provided by successively stacking a positive electrode plate, a negative electrode plate, and a separator, and is encapsulated within the laminate films 21, 22. In case of the laminate-sheathed cell 11 including the stacked type of electric-power generating element 31, it is required to apply a pressure to grip the electric-power generating element 31 so as to keep the distance between the electrode plates constant to thereby maintain the cell performance.

Figure 2A:
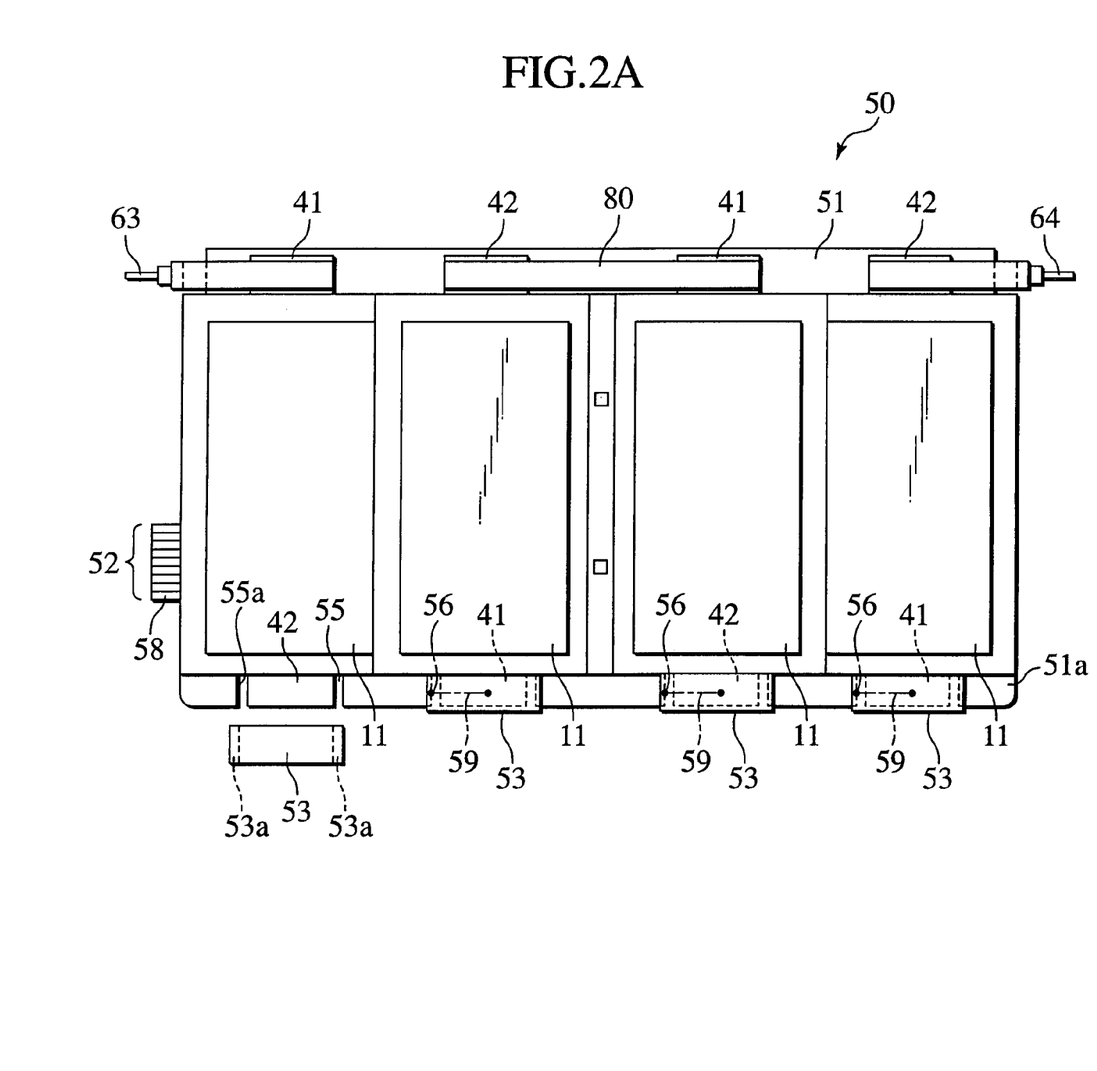
FIG. 2A and FIG. 2B are a front view and a side view, respectively, of a retention member in a state that the retention member retains laminate-sheathed cells therein.
Figure 2B:
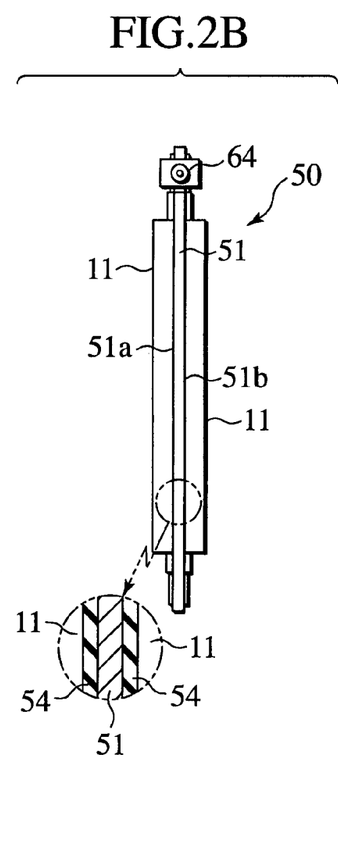

To this end, the printed-wiring board 51 in this embodiment has its retaining surfaces carrying elastic sheets 54 adhered thereto, and these elastic sheets 54 are to be compressed and elastically deformed by the laminate-sheathed cells 11 when the cells 11 are accommodated within the case 61 (see the partially enlarged view in FIG. 2B). Elastic deformation of the elastic sheets 54 allows the laminate-sheathed cells 11 to be accommodated within the case 61, in a state that the electric-power generating elements 31 are clamped between the case 61 and printed-wiring board 51. Usable as the elastic sheet 54 is an appropriate elastic material such as rubber or urethane. The reason why the elastic sheets 54 are provided on the retaining surfaces of the printed-wiring board 51, respectively, is that, the elastic sheets 54 previously adhered to the printed-wiring board 51 enable an increased productivity upon mounting the laminate-sheathed cells 11 onto the printed-wiring board 51, while the heat dissipation ability would be deteriorated if the elastic sheets 54 were interposed between the laminate-sheathed cells 11 and the inner surface of the case 61. It is advisable to interpose thermally conductive sheets having a higher thermal conductivity between the laminate-sheathed cells 11 and the inner surfaces of the case 61 so as to closely contact them with each other, so that the heat generated from the laminate-sheathed cells 11 is highly dissipated to the exterior. In such a case, adoption of highly thermally conductive sheets having elasticity enables the electric-power generating elements 31 to be more preferably gripped.

Referring to FIG. 6B, each of the laminate films 21, 22 is typically a composite sheet comprising two or more layers, and typically includes, from the inside to the outside, a sealing layer 24 to be heat-welded, a metal layer 25 such as an aluminum laminate film, and a resin layer 26 forming an outer sheath. The sealing layer 24 is formed of a heat-sealable resin. Applicable heat-sealable resin materials include those thermoplastic resin materials such as polypropylene (PP), polyethylene (PE) and the like.

The laminate films 21, 22 have rectangular shapes, respectively, and are coated onto the associated electric-power generating element 31 in a manner to interpose it therebetween. The sealing layers 24 of the pair of laminate films 21, 22 are joined to each other by heat-welding, from the outer periphery of the associated electric-power generating element 31 to the outer ends of the laminate films. At those portions where the electrode terminals 41, 42 are protruded, the aluminum plates constituting the electrode terminals 41, 42 are directly joined to the sealing layers 24, respectively, by heat-welding. Among four sides 23a through 23d of the outer periphery 23, the two sides 23a and 23c, through which the electrode terminals 41, 42 are protruded, respectively, are portions where small gaps are likely to be caused due to vibration transmitted via electrode terminals 41, 42. Therefore, the tear strengths at the sides 23a and 23c through which the electrode terminals 41, 42 are protruded, are generally increased as compared with tear strengths at the other two sides 23b and 23d. The tear strengths of the sides 23a and 23c are increased as compared with those of the sides 23b and 23d, by exemplarily applying surface treatment to the electrode terminals 41, 42, by adjusting the material of the sealing layers 24, or by changing the manner or conditions of heat-welding. The heat-welded outer periphery 23 is also called a "sealed portion 23".

In case of generation of gas within the cell due to abnormality such as overcharge, there is torn that heat-welded portion of the side 23b or side 23d which has a weaker tear strength among the four sides 23a through 23d of the sealed portion 23 when the pressure of the generated gas becomes higher than a predetermined pressure, and then the gas is released to the exterior through the torn portion. This prevents such a situation that the laminate-sheathed cell 11 is exploded, and improves the reliability upon abnormality. The predetermined pressure at which the heat-welded portion of the side 23b or side 23d is torn, can be appropriately set by exemplarily varying the width of the sealed portion 23 or the heat-welding conditions, and the predetermined pressure may be about 1 kgf/cm², for example.

Referring to FIGS. 7A through 7C, the case 61 includes: a casing 70 exhibiting a substantially flat shape so as to accommodate the laminate-sheathed cells 11 therein, in a hermetically sealed state; and a tearing valve (not shown) for releasing a gas generated from the laminate-sheathed cell 11 and spread within the casing 70 upon abnormality, toward the exterior, when the gas pressure has reached the predetermined pressure.

The casing 70 includes first and second casing halves 71 and 72 to be abutted onto each other to thereby define a cell accommodating space within the casing 70. The first and second casing halves 71 and 72 have flat rectangular shapes (see FIG. 7A), respectively, and have arcuately rounded upper end portions and lower end portions (see FIG. 7C), respectively. The dimensions of the casing 70 may be appropriately selected. The casing 70 in the illustrated embodiment has such dimensions to accommodate therein the printed-wiring board 51 which retains totally eight laminate-sheathed cells 11 comprising four and four laminate-sheathed cells 11 aligned in the widthwise direction on the obverse and reverse surfaces 51a and 51b of the printed-wiring board 51, respectively. Although it is possible to select an appropriate material such as metal material or resin material for the first and second casing halves 71 and 72, it is desirable that the casing halves are made of metal material such as aluminum or stainless steel from a standpoint of cooling performance and strength. The first and second casing halves 71 and 72 are fastened to each other by fastening screws (not shown) such that the cell accommodating space is brought into a hermetically sealed state and is sealed from moisture. It is possible to enhance the water-tightness at the abutted surfaces of the first and second casing halves 71 and 72, by exemplarily coating a sealing material thereon, or by interposing a sealing member like a packing therebetween. Defined between the abutted side surfaces of the first and second casing halves 71 and 72, is a circular through-hole 73 in which the positive terminal 63 and negative terminal 64 of the cell assembly 12 are arranged (see FIG. 1).

The casing 70 is provided with one or more tearing valves. It is possible to employ an appropriate constitution for the tearing valve, and the tearing valve exemplarily includes: a gas releasing hole opened at the casing 70; and a sealing plate for sealing the gas releasing hole and for opening the gas releasing hole when the internal pressure of the casing 70 has reached a predetermined pressure. The sealing plate is formed of an appropriate material such as a sealing material, metal material or resin material, and is mounted by a joiner such as adhesive or heat sealing in a manner to seal the gas releasing hole. When the gas generated from the laminate-sheathed cell 11 into the casing 70 upon abnormality has reached the predetermined pressure, the sealing plate is torn or bursted and the gas spread within the casing 70 is released to the exterior through the gas releasing hole. This prevents abnormal expansion, breakage and the like of the case 61. The predetermined pressure, at which the tearing valve is operated, can be appropriately set by exemplarily changing the material, the wall thickness of the sealing plate, the kind of adhesive to be used, and/or the heat-welding conditions, and the predetermined pressure is set to be the same as the pressure, at which the sealed portion 23 of the laminate-sheathed cell 11 is torn, i.e., about 1 kgf/cm², for example.

In assembling the battery module 60, the elastic sheets 54 are firstly adhered onto the retaining surfaces of the obverse and reverse surfaces 51a and 51b of the printed-wiring board 51 printed with the voltage measurement wirings 52, respectively. The printed-wiring board 51 is then oriented horizontally, and four laminate-sheathed cells 11 are arranged thereon while placing the applicable electrode terminals 41, 42 into the associated recesses 55, respectively. The sides 23b and 23d of the two laminate-sheathed cells 11 at the left side are overlapped with each other, and the sides 23b and 23d of the other two laminate-sheathed cells 11 at the right side are overlapped with each other (see FIG. 2).

When the laminate-sheathed cells 11 are arranged on the printed-wiring board 51, the applicable electrode terminals 41, 42 are overlapped with the associated measurement terminals 57, respectively. The four laminate-sheathed cells 11 are temporarily fixed, and the overlapped portions in this state are soldered or ultrasonic welded to each other, to thereby electrically connect the electrode terminals 41, 42 of the laminate-sheathed cells 11 to the measurement terminals 57, respectively. Additionally, the positive electrode terminal 41 of the leftmost laminate-sheathed cell 11 on the obverse surface 51a is electrically connected with the positive terminal 63, and the negative electrode terminal 42 of the rightmost laminate-sheathed cell 11 on the obverse surface 51a is electrically connected with the negative terminal 64.

The printed-wiring board 51, in the state where the four laminate-sheathed cells 11 are temporarily fixed thereon, is turned over back to front, and then the remaining four laminate-sheathed cells 11 are arranged and the electrode terminals 41, 42 thereof are connected to the associated measurement terminals 57, respectively, in the same manner as the above. This results in a state that the electrode terminals 41, 42 of the paired two laminate-sheathed cells 11 on the obverse and reverse sides, respectively, are positioned in the associated recess 55 of the printed-wiring board 51.

Next, each clipping member 53 is fitted into the associated recess 55, while inserting the associated electrode terminals 41, 42 into the accommodating space for the clipping member 53. This simultaneously completes both the electrical connection between the two electrode terminals 41, 42 positioned within the associated recess 55, and the electrical connection between the electrode terminals 41, 42 and the associated voltage measurement wiring 52.

Then, the temporary fixation of the laminate-sheathed cells 11 is quitted, and the printed-wiring board 51 retaining thereon the plurality of laminate-sheathed cells 11 is accommodated into the case 61 and the potting material is filled thereinto, for example, thereby completing the assembling of the battery module 60.

In the battery module 60 according to the first embodiment, the retention member 50 for retaining the laminate-sheathed cells 11 is configured with the printed-wiring board 51 printed with the voltage measurement wirings 52 for measuring the voltages of the laminate-sheathed cells 11, respectively, so that the laminate-sheathed cells 11 are retained by the relatively rigid printed-wiring board 51, thereby facilitating the handling of the laminate-sheathed cells 11 and increasing the production efficiency. Further, the voltage measuring operation such as the cable drawing-around operation in the conventional can be drastically reduced. Moreover, no cables are provided within the case 61, thereby making it unnecessary to reserve a space for arranging cables within the case 61, and thereby enabling downsizing of the case 61, thus of the power source adopting the case 61. Furthermore, since no cables are provided, there is never caused such a situation where cables apply stress to the laminate-sheathed cells 11.

The battery module further includes the clipping members 53 detachably attached to the printed-wiring board 51 to thereby electrically connect the electrode terminals 41, 42 of the laminate-sheathed cells 11 to the voltage measurement wirings 52, respectively, thereby allowing to simultaneously complete both the electrical connection between the paired two electrode terminals 41, 42 positioned within the associated recess 55, and the electrical connection between the electrode terminals 41, 42 and the associated voltage measurement wiring 52, so that the production efficiency can be further increased.

Each clipping member 53 further has a positioning function for restricting the positions of the associated laminate-sheathed cells 11 relative to the printed-wiring board 51, thereby enabling to omit dedicated members and dedicated operations for duly positioning the laminate-sheathed cells 11, so that the production efficiency can be further increased.

The battery module further includes the elastic sheets 54 which are provided on the retaining surfaces of the printed-wiring board 51 and which are compressed and elastically deformed by the laminate-sheathed cells 11 when the printed-wiring board is accommodated into the battery accommodation case. Thus, in case of laminate-sheathed cells 11 provided with stacked types of electric-power generating elements 31, the electric-power generating elements 31 can be pressurized and gripped, thereby allowing to keep distances between electrode plates constant, to thereby maintain the cell performance and prolong the service life.

Further, the printed-wiring board 51 retains the cell assembly 12 configured with the plurality of laminate-sheathed cells 11 electrically connected together and the printed-wiring board 51 is printed with the plurality of voltage measurement wirings 52 for measuring the voltages of the plurality of laminate-sheathed cells 11, respectively, so that many laminate-sheathed cells 11 can be easily handled and the production efficiency can be further increased. Moreover, the voltage measuring operation such as the cable drawing-around operation can be drastically reduced, thereby also enabling to downsize the power source.

In the above, the plurality of laminate-sheathed cells 11 are retained by the obverse and reverse surfaces 51a and 51b of the printed-wiring board 51 and the plurality of voltage measurement wirings 52 are printed on the obverse and reverse surfaces 51a and 51b of the printed-wiring board 51, so that the battery module can be downsized by effectively utilizing the widthwise direction of the printed-wiring board 51 to the utmost, and so that the laminate-sheathed cells 11 provided on the obverse and reverse surfaces are allowed to independently conduct heat dissipation to thereby restrict degradation of the cell performance.

Each unit cell 11 is the laminate-sheathed cell 11 comprising the electric-power generating element encapsulated within the laminate film, thereby allowing to provide the light-weighted battery module 60.

Note that the battery module 60 is not limited to the details described with respect to the above embodiment, and the conventionally known measures may be appropriately adopted. For example, the electrode terminals 41, 42 of the paired two laminate-sheathed cells 11 may be coupled to each other, by heat-welding, laser welding, electron-beam welding, by a rivet, or by a caulking technique.

In the above, the illustrated laminate-sheathed cell 11 is provided in the configuration that the positive and negative electrode terminals 41, 42 for the associated electric-power generating element 31 are connected to the opposite end surfaces of the electric-power generating element 31, respectively. However, the present invention is also applicable to a situation for accommodating a laminate-sheathed cell provided in a configuration where both positive and negative electrode terminals 41, 42 are connected to one end surface of the associated electric-power generating element 31.

Second Embodiment

Figure 8:
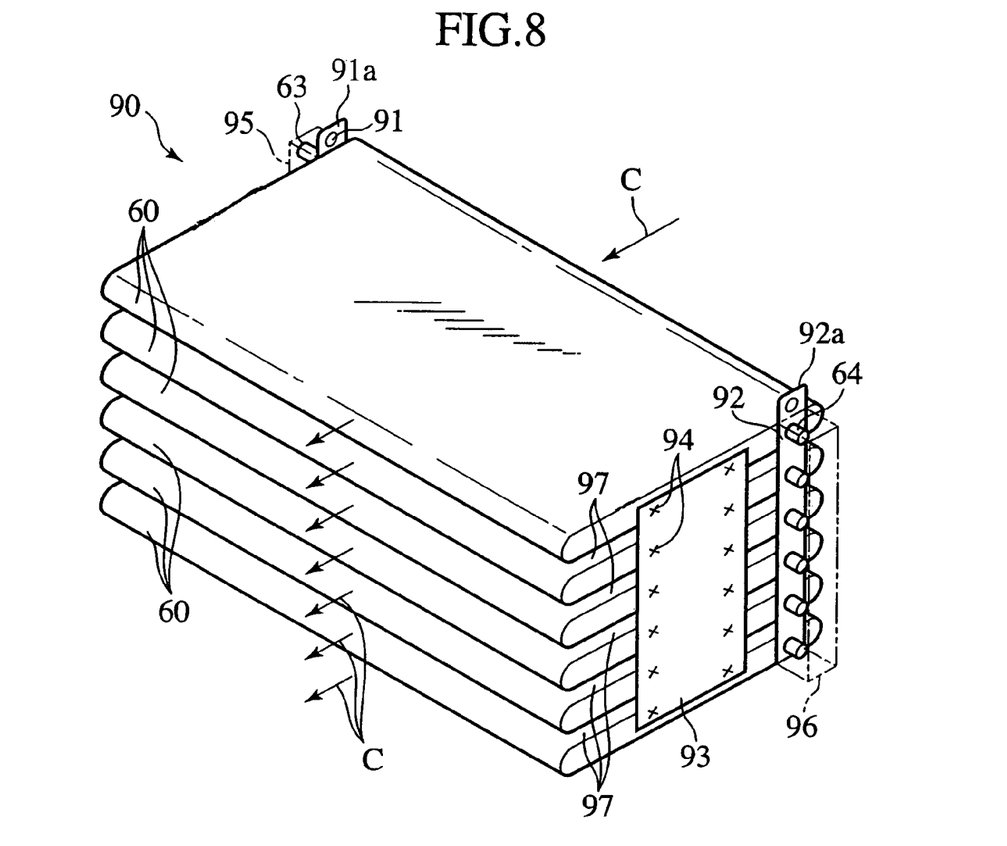
FIG. 8 is a perspective view of a combination battery according to a second embodiment of the present invention.
Figure 9:
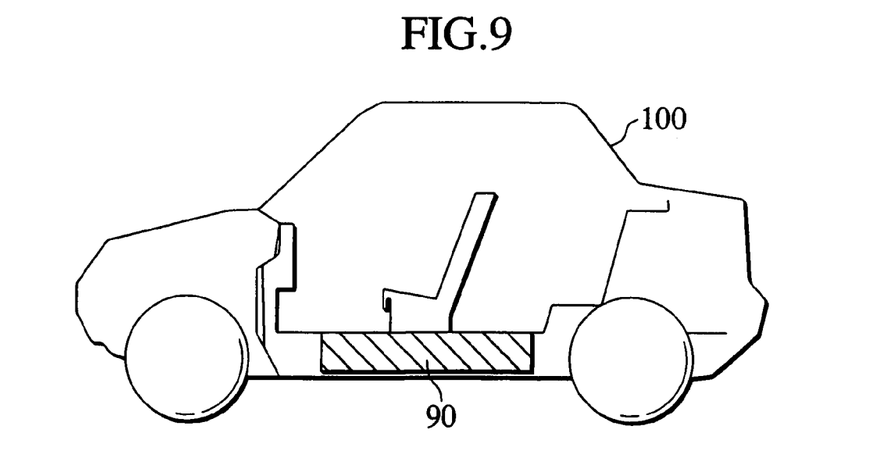
FIG. 9 is a schematic view of a vehicle comprising the combination battery mounted thereon.

FIG. 8 is a perspective view of a combination battery 90 according to a second embodiment of the present invention, and FIG. 9 is a schematic view of a vehicle 100 comprising the combination battery 90 mounted thereon.

The combination battery 90 of the second embodiment is configured by stacking a plurality of battery modules 60 according to the first embodiment, via clearances 97 for flowing cooling air C therethrough. While the dimension of each clearance 97 may be appropriately set, there can be exemplarily adopted a dimension within a range of 2 mm to 4 mm from a standpoint for stacking the battery modules in as many stages as possible within a limited space and for realizing a preferable flow of cooling air C.

While the plurality of battery modules 60 in a combination battery may be independently used without a mutual electrical connection, the illustrated embodiment includes the combination battery 90 configured by electrically connecting the plurality of battery modules in parallel. Preparing the plurality of battery modules into the combination battery 90 enables to deal with the demand for a battery capacity or output for each purpose of use, in a relatively inexpensive manner without fabricating a newly dedicated type of battery module 60.

To establish the combination battery 90 by parallelly connecting six battery modules 60 as shown in FIG. 8, the positive terminals 63 and negative terminals 64 of the battery modules 60 are electrically connected to each other, by a positive-terminal coupling plate 91 having an outer positive-terminal portion 91a and a negative-terminal coupling plate 92 having an outer negative-terminal portion 92a, respectively. Further, each case 61 is provided with screw-hole portions (not shown) at both sides, and the battery modules 60 are coupled to one another by fixing, joint plates 93 having opening portions corresponding to the screw-hole portions, to the screw-hole portions by setscrews 94, respectively. The positive terminals 63 and negative terminals 64 of the battery modules 60 are protected by a positive-electrode insulating cover 95 and a negative-electrode insulating cover 96, respectively, and distinguished from each other by appropriate coloring such as red and blue. Provided between the upper battery modules 60 and lower battery modules 60 are the clearances 97 for passing therethrough the cooling air C, respectively.

Thus, even when the laminate-sheathed cell(s) 11 or battery module(s) 60 is/are troubled in the combination battery 90 established by parallelly connecting the plurality of battery modules 60, the combination battery 90 can be repaired by simply replacing the troubled element(s).

When the combination battery 90 is to be installed in an electric vehicle (EV) 100 as shown in FIG. 9, it is installed under a seat at the central portion of the vehicular body. This is because, the installment under the seat enables to reserve a wider in-vehicle space and a wider trunk room. Note that the combination battery installment position is not limited to that under the seat, and may be under a rear trunk room. In case of an EV or FCV (fuel-cell vehicle) without engines, the combination battery may be installed at a front part of the vehicle where an engine was typically installed.

Further, each laminate-sheathed cell 11 is relatively light-weighted as compared with a cell using a metallic outer canister, thereby contributing to lightening the combination battery 90, thus the whole of the vehicle 100, and therefore contributing to improving the mileage of an EV vehicle, for example.

As described above, since the combination battery 90 according to the second embodiment is configured by stacking the plurality of battery modules 60, the combination battery 90 can be obtained in various capacities and/or voltages by simply changing the number of fundamental or elemental battery modules 60 or by changing the connecting manner thereof.

Further, installment of the battery module 60 or combination battery 90 prevents an excessively increased weight of the vehicle 100 and prevents an excessively narrowed effective space, thereby enabling to provide the vehicle 100 superior in the mileage and running performance.

Although the combination battery 90 provided by vertically stacking the plurality of battery modules 60 has been illustrated, the assembling direction is not limited to the vertical. For example, the combination battery may be established such that a plurality of vertically upstanding battery modules 60 are juxtaposed with each other in a lateral direction.

Further, the installing manner is not limited to the combination battery 90 in the EV, for example, and it is possible to install a battery module(s) 60 only, or a combination of combination battery 90 and battery module(s) 60, depending on the usage in a suitable vehicle. The vehicle 100, in which the battery module 60 or combination battery 90 of the present invention can be installed, preferably includes an EV, FCV or hybrid electric vehicle (HEV), without limited thereto.

Third Embodiment

Figure 10:
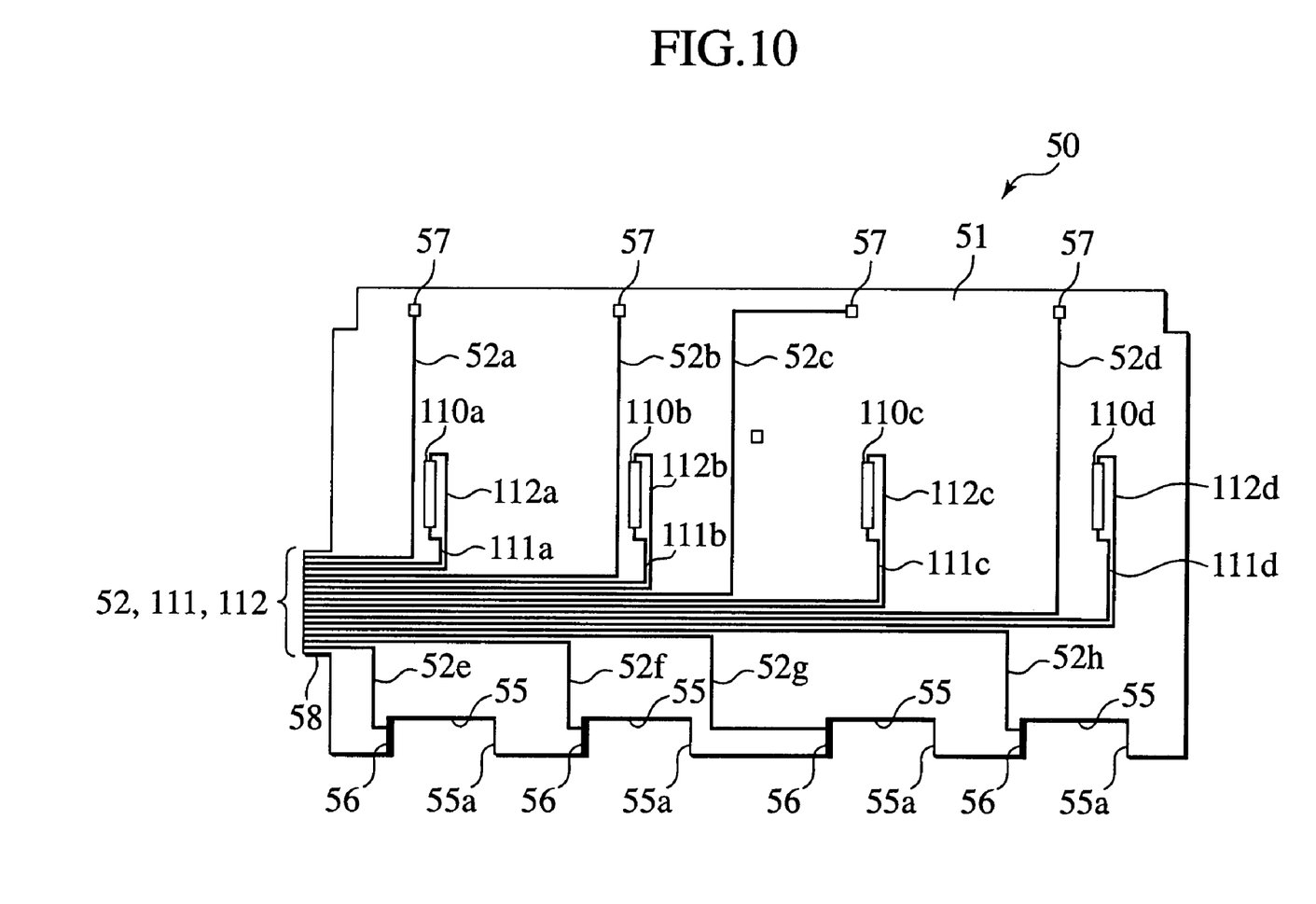
FIG. 10 is a front view of a printed-wiring board constituting a retention member according to a third embodiment of the present invention.

FIG. 10 is a front view of a printed-wiring board constituting a retention member according to a third embodiment of the present invention.

The third embodiment is provided by adding temperature detectors 110 (generic term for 110a through 110d), and temperature measurement wirings 111 (generic term for 111a through 111d) and 112 (generic term for 112a through 112d) to the printed-wiring board of the first embodiment, and constituent elements identical with those of the first embodiment are denoted by the same reference numerals and the explanation thereof shall be omitted.

Note that it is possible to control input and output voltages of the laminate-sheathed cells 11 in the secondary battery of the present invention correspondingly to the temperature characteristics of the laminate-sheathed cells 11, by individually measuring voltages of the laminate-sheathed cells 11 and individually detecting the temperatures thereof.

Arranged on the printed-wiring board 51 are the temperature detectors 110 at the arranging positions of the laminate-sheathed cells 11, respectively. Each temperature detector 110 comprises a wiring such as a K type of thermocouple or a thermistor, which preferably has a measuring range of about −50° C. to +100° C. Although it is preferable that the temperature detector is configured with a printed wiring to thereby exclude any irregularity at the arrangement surface for the associated laminate-sheathed cell 11, it is also possible to exemplarily attach such a small-sized chip as the temperature detector to the board, which chip never obstructs the arrangement of the laminate-sheathed cell 11. The above temperature detector 110 are arranged at the arranging positions of the plurality of laminate-sheathed cells 11 on the printed-wiring board 51, respectively, and are connected to the terminal section 58 via temperature measurement wirings 111, 112, respectively. Also, the temperature detector 110 and temperature measurement wirings 111, 112 are arranged on the opposite surface of the printed-wiring board 51.

In this way, the terminal section 58 is connected to a power-source controlling part (not shown), thereby allowing to detect the temperatures of the laminate-sheathed cells, respectively.

Thus, in the third embodiment, it becomes possible to omit separate provision of the temperature detector themselves as well as separate wirings for the temperature detector, in addition to the effects provided by the first embodiment.

Although the temperature detector 110 have been arranged for the individual laminate-sheathed cells 11 in this embodiment, respectively, it is also possible to decrease the number of temperature detector depending on the requirement of temperature management. In that case, it is possible to detect the temperature of a specific laminate-sheathed cell(s) 11 only, or to detect the temperature of the whole assembly of the laminate-sheathed cells 11 at a position offset from the arranging positions of the laminate-sheathed cells 11.

Fourth Embodiment

FIG. 11 through FIG. 14 relate to an improvement of the bus-bars 80 for mutually connecting the upper electrode terminals 41, 42 (right and left terminals) of the neighboring laminate-sheathed cells 11 on the printed-wiring board of the first embodiment, respectively. The bus-bars in the first embodiment have been connected to the electrode terminals 41, 42 by soldering or ultrasonic welding, and these electrode terminals have been soldered or ultrasonic welded to the measurement terminals 57, respectively, so as to ensure the connection therewith.

In the fourth embodiment, the bus-bars are fixed to the board by fastener such as bolt or rivet. In this case, the electrode terminals 41, 42 are clamped between the bus-bars and the board, respectively, thereby ensuring electrical connections between the bus-bars and electrode terminals by crimping, respectively. Further, since measurement terminals 57 are arranged at the fastening locations, the connection between the electrode terminals and the measurement terminals 57 can also be ensured.

Figure 3A:
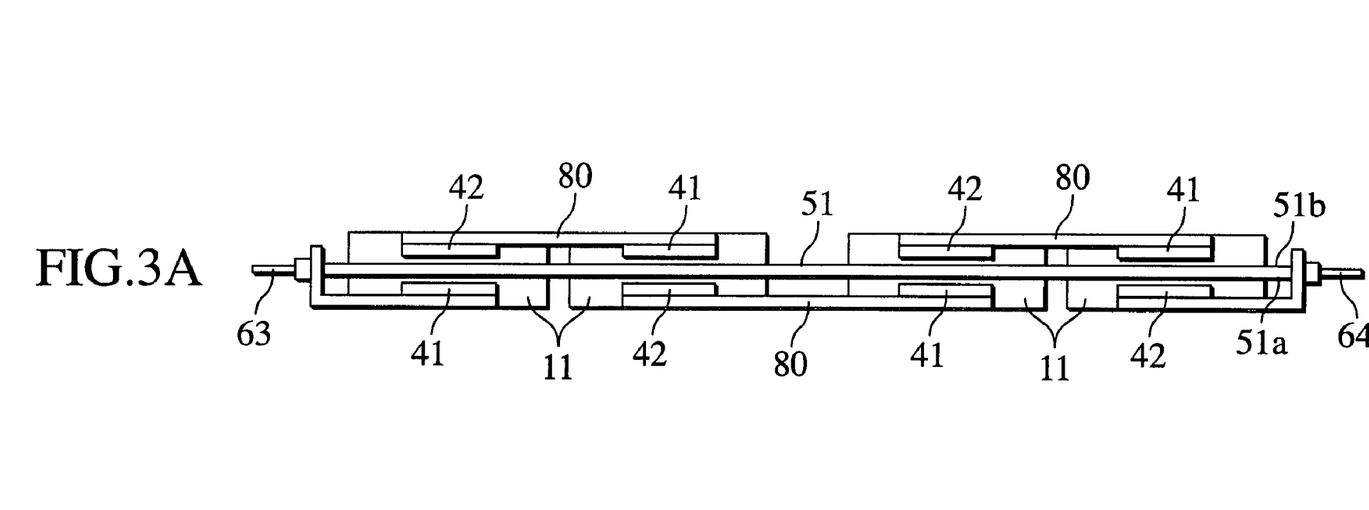
FIG. 3A and FIG. 3B are a front view and a bottom view, respectively, of the retention member in a state that the retention member retains the laminate-sheathed cells therein.
Figure 3B:
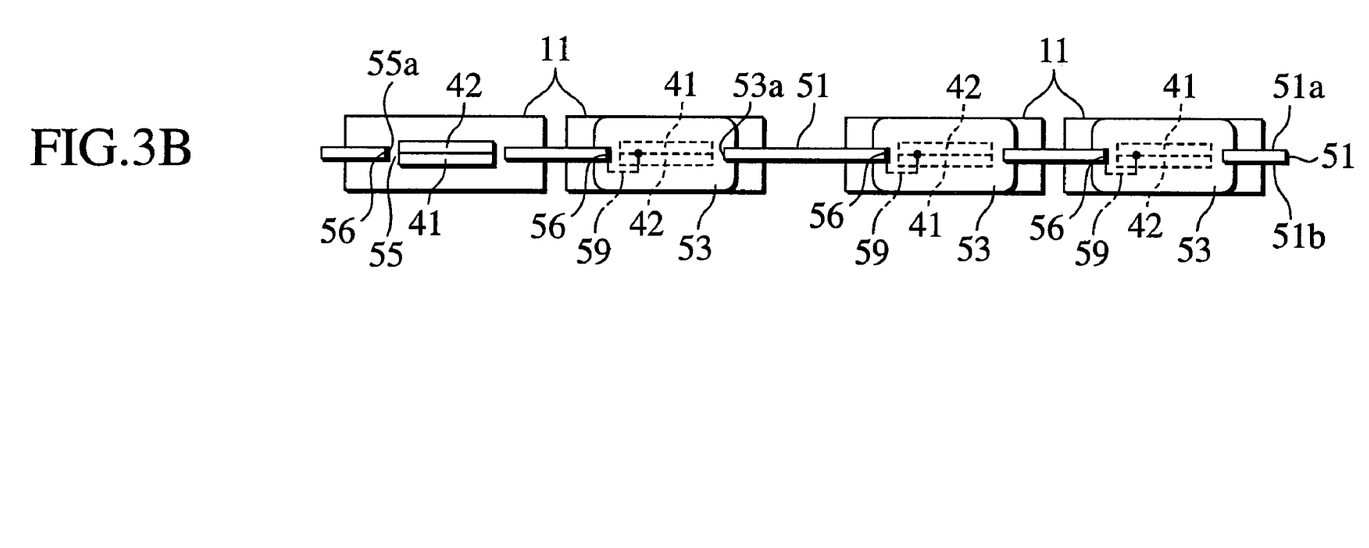
Figure 11A:
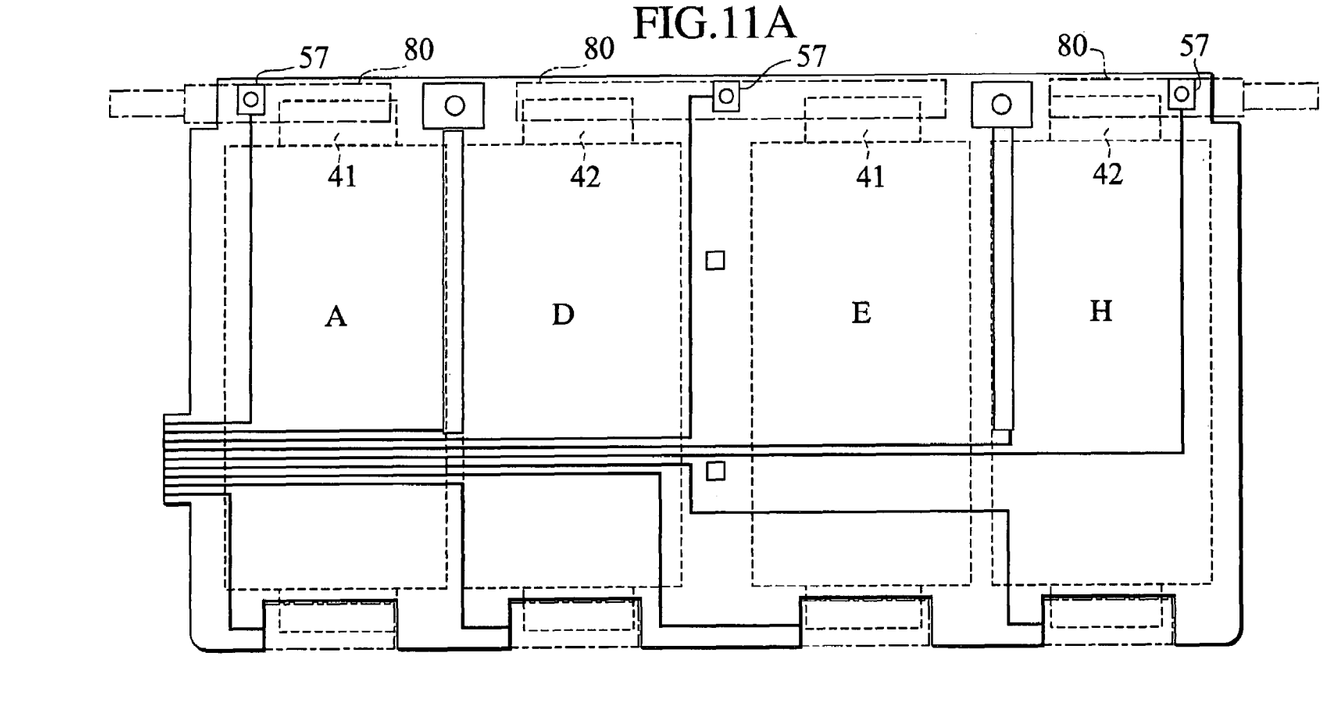
FIG. 11A is a front view of a battery module according to a fourth embodiment of the present invention including eight unit cells connected together in series.
Figure 11B:
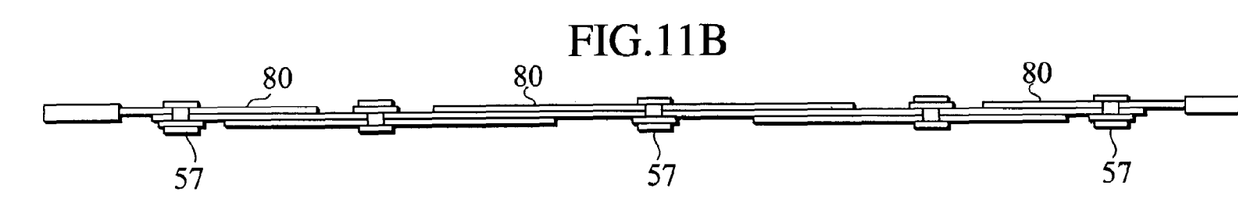
FIG. 11B is a bottom view of the battery module for exclusively showing a relationship between bus-bars and the printed-wiring board of the battery module, where voltage measurement terminals in this battery module are provided on both surfaces of the printed-wiring board, respectively, in one version.

Meanwhile, it is required in this embodiment that the upper electrodes of the laminate-sheathed cells at the obverse surface of the printed-wiring board are electrically insulated from the corresponding upper electrodes of the laminate-sheathed cells at the reverse surface of the printed-wiring board, respectively (see FIG. 3A, for example). Therefore, the fastening positions are arranged at locations other than the electrode terminals, as shown in FIG. 11A. Such an arrangement enables to simultaneously obtain the electrical connection between the electrode terminals and bus-bars and the electrical connection between the electrode terminals and measurement terminals 57, respectively.

Figure 12A:
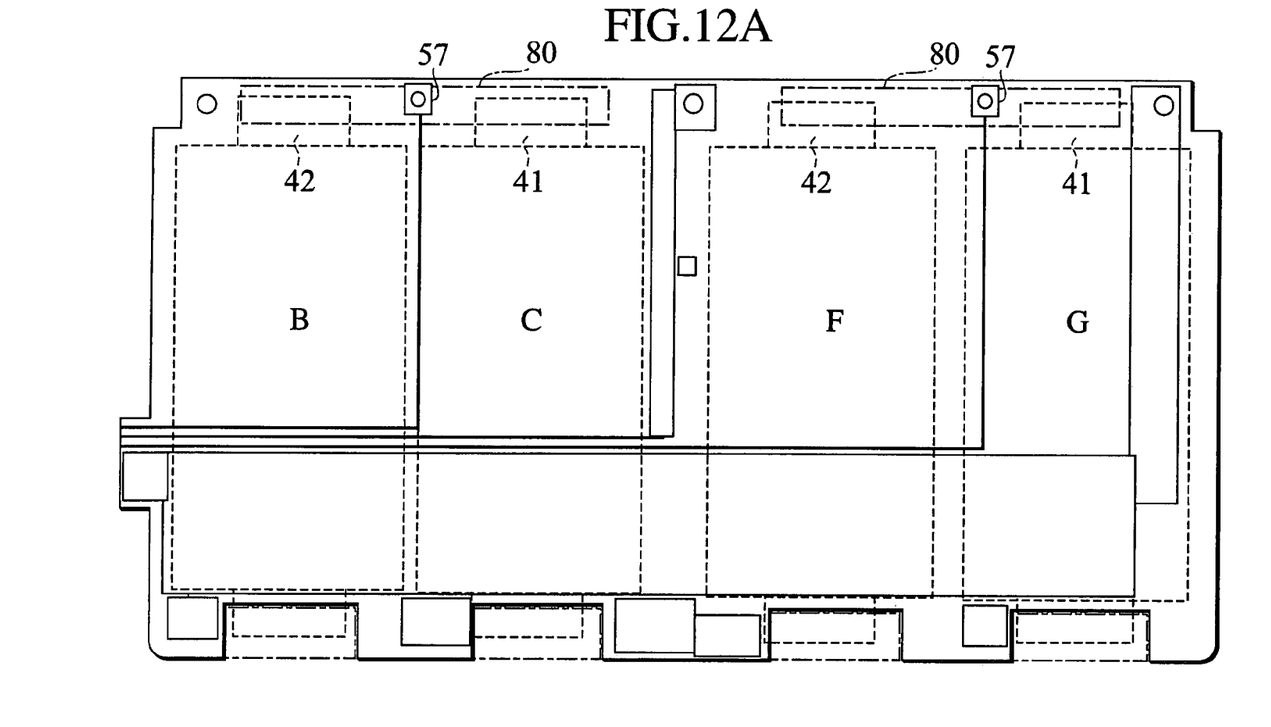
FIG. 12A is a see-through rear view of the battery module shown in FIGS. 11A and 11B.
Figure 12B:
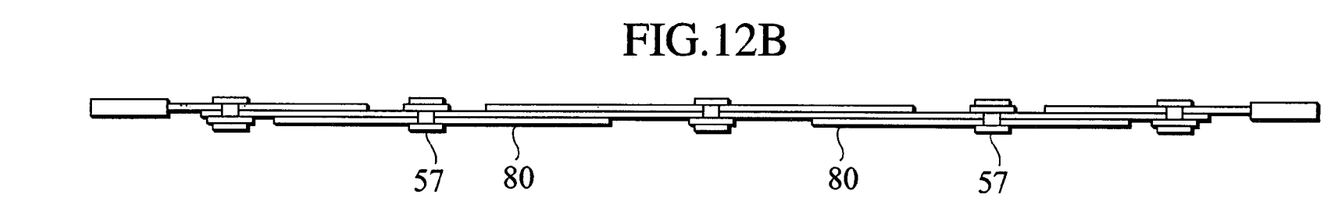
FIG. 12B is a bottom view identical with FIG. 1B.

FIG. 12A is a see-through rear view of the battery module, and the electrode terminals 41, 42 are clamped between the bus-bars and the board similarly to the obverse surface of the board, thereby ensuring the electrical connection between the electrode terminals and the bus-bars by crimping. Further, the measurement terminals 57 are arranged at the fastening locations, respectively, thereby allowing to ensure the electrical connections between the electrode terminals and the measurement terminals 57, respectively.

Figure 13A:
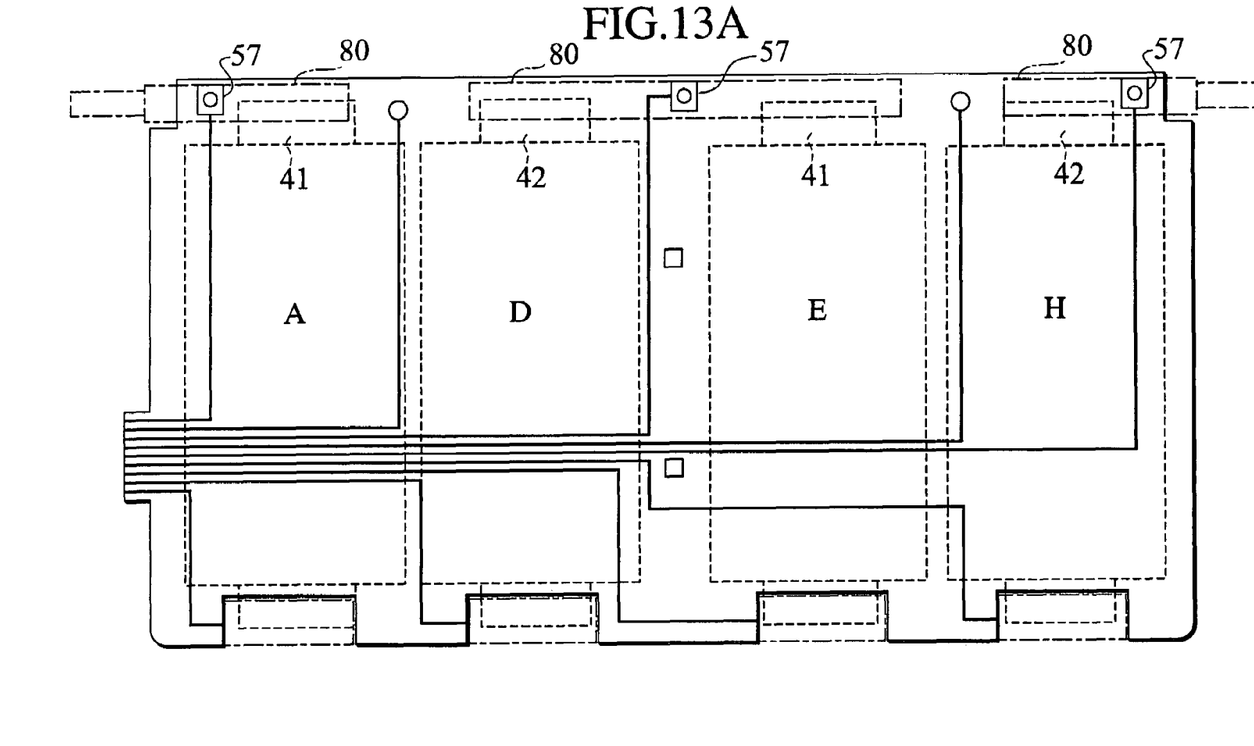
FIG. 13A is a front view of a battery module also according to the fourth embodiment of the present invention including eight unit cells connected together in series.
Figure 13B:
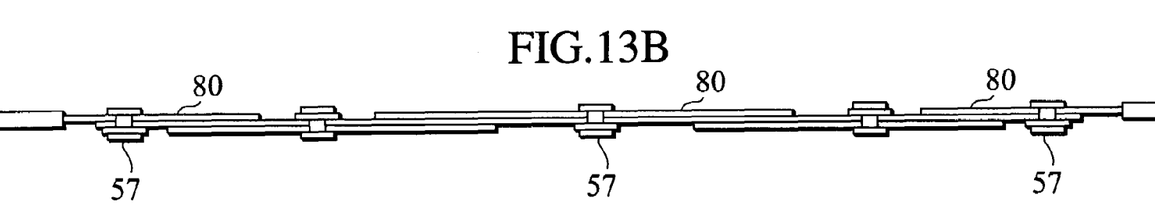
FIG. 13B is a bottom view of the battery module for exclusively showing a relationship between bus-bars and the printed-wiring board of the battery module, where voltage measurement terminals in this battery module are provided on one surface of the printed-wiring board, in another version.
Figure 14A:
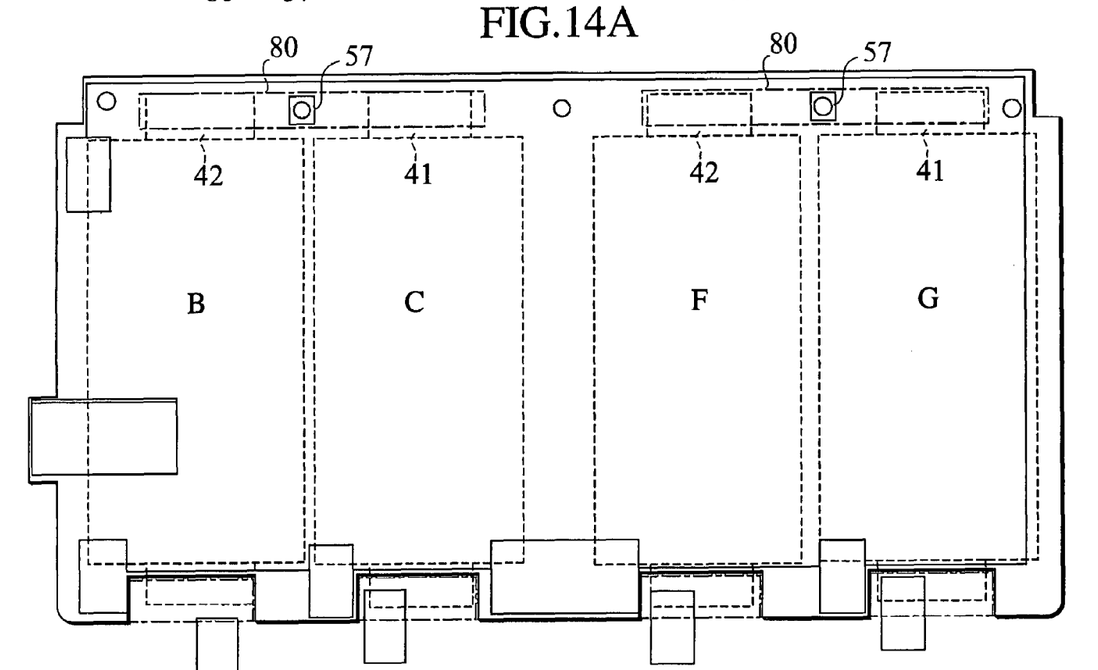
FIG. 14A is a see-through rear view of the battery module shown in FIGS. 13A and 13B.
Figure 14B:
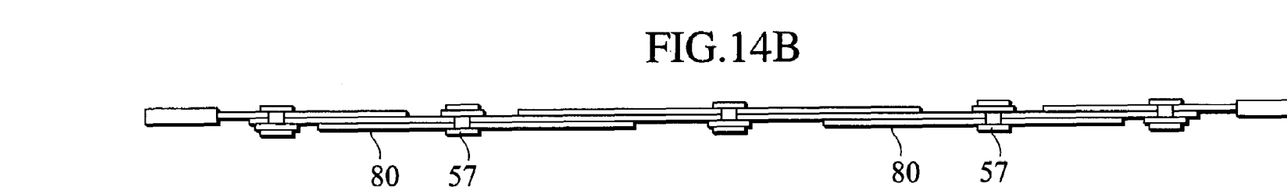
FIG. 14B is a bottom view identical with FIG. 13B.

Further, FIG. 13 and FIG. 14 show another version of the fourth embodiment which is characterized in that the measurement terminals 57 are arranged on only one side of the board. Namely, electroconductive materials are used as the fastener, for electrical connection from the bus-bars or electrode terminals at the reverse surface side to the measurement terminals at the obverse surface side of the board. This allows to limit the printed surface of the printed-wiring board to only one side thereof, thereby achieving an advantageous cost performance.

According to the fourth embodiment, the cell voltage can be monitored without welding. Further, the bus-bars can be fixed to the printed-wiring board 51, thereby improving the vibration resistance.

Other Embodiments

Although the battery modules have been described concerning the embodiments each including the plurality of unit cells connected together in series, the present invention is not limited thereto and can be applied to a battery module including a plurality of unit cells connected in parallel by utilizing such a feature of a printed-wiring board that the freedom degree of wiring pattern is high. It is also possible to form: a wiring pattern having the function of the bus-bars 80 for connecting the electrode terminals 41, 42 to each other; on the printed-wiring board. Further, although there have been described the embodiments including the applicable electrode terminals 41, 42 clamped by the clipping members 53 and electrically connected to each other, it is possible to adopt such a constitution that the applicable two electrode terminals of the pertinent two unit cells are individually electrically connected to the associated voltage measurement wirings, respectively, while clamping and fixing the applicable two electrode terminals in a state electrically insulated from each other.

According to the embodiments described, a plurality of unit cells are retained by a relatively rigid printed-wiring board to thereby exhibit such an effect that the handling of unit cells is facilitated to thereby enhance the production efficiency, while exhibiting another effect that the voltage measuring operation such as a cable drawing-around operation can be drastically reduced and the power source can be downsized.

The present invention can be used in an application for facilitating the handling of unit cells and for enhancing the production efficiency.

The entire contents of Japanese Patent Application No. 2003-353528, filed on Oct. 14, 2003, and Japanese Patent Application No. 2004-243810, filed on Aug. 24, 2004, are incorporated herein by reference.

While preferred embodiments of the present invention have been described using specific terms, such description is for illustrative purposes, and it is to be understood that changes and variations may be made without departing from the spirit or scope of the following claims.

What is claimed is:

1. A battery module comprising:
   a cell assembly configured with a plurality of unit cells electrically connected together, each unit cell including an electric-power generating element and a laminate film encapsulating the electric-power generating element therein,
   a battery accommodation case configured to accommodate the cell assembly therein; and
   a retention member configured to retain the plurality of unit cells as the cell assembly, the retention member being configured with a printed-wiring board printed with voltage measurement wirings configured to measure voltages of the plurality of unit cells, respectively.

2. The battery module as claimed in claim 1, wherein the battery module further comprises clipping members which are detachably attached to the printed-wiring board and which electrically connect electrode terminals of the plurality of unit cells to the voltage measurement wirings, respectively.

3. The battery module as claimed in claim 2, wherein each of the clipping members further has a positioning function to restrict positions of associated ones of the plurality of unit cells, relative to the printed-wiring board.

4. The battery module as claimed in claim 1, wherein the battery module further comprises elastic bodies which are provided on retaining surfaces of the printed-wiring board, respectively, and which are compressed and elastically deformed by the plurality of unit cells when the printed-wiring board is accommodated in the battery accommodation case.

5. The battery module as claimed in claim 1, wherein the plurality of unit cells are retained on both obverse and reverse surfaces of the printed-wiring board, and
   wherein the plurality of voltage measurement wirings are printed on both the obverse and reverse surfaces of the printed-wiring board.

6. The battery module as claimed in claim 1, wherein the retention member further comprises a temperature measurement wiring configured to measure a temperature of the plurality of unit cells.

7. The battery module as claimed in claim 1, wherein the battery module further comprises bus-bars and fastening members configured to fasten the bus-bars to the printed-wiring board, respectively,
   wherein the bus-bars cause electrode terminals of the plurality of unit cells to be electrically connected to the voltage measurement wirings, respectively,
   wherein the bus-bars electrically and mutually connect electrode terminals of those of the plurality of unit cells which are neighbored to each other in a direction of plane of the printed-wiring board, respectively, and
   wherein the fastening members are fastened to the printed-wiring board, at the voltage measurement wirings of the printed-wiring board, respectively.

8. The battery module as claimed in claim 7, wherein the fastening members are electroconductive.

9. A combination battery configured with a plurality of battery modules according to claim 1, the plurality of battery modules being electrically connected to each other in parallel and/or in series.

10. A vehicle comprising a battery module according to claim 1 mounted thereon.

11. A vehicle comprising a combination battery according to claim 9 mounted thereon.

* * * * *